(12) United States Patent
Spratte et al.

(10) Patent No.: US 7,405,557 B2
(45) Date of Patent: Jul. 29, 2008

(54) BALL-AND-SOCKET JOINT WITH AN ANGLE SENSOR

(75) Inventors: Joachim Spratte, Osnabrück (DE); Uwe Loreit, Wetzlar (DE)

(73) Assignees: ZF Friedrichshafen AG, Friedrichshafen (DE); Sensitec GmbH, Lahnau (DE)

(*) Notice: Subject to any disclaimer, the term of this patent is extended or adjusted under 35 U.S.C. 154(b) by 110 days.

(21) Appl. No.: 10/568,851

(22) PCT Filed: Aug. 19, 2004

(86) PCT No.: PCT/DE2004/001855

§ 371 (c)(1),
(2), (4) Date: Oct. 5, 2006

(87) PCT Pub. No.: WO2005/021295

PCT Pub. Date: Mar. 10, 2005

(65) Prior Publication Data

US 2007/0040355 A1    Feb. 22, 2007

(30) Foreign Application Priority Data

Aug. 22, 2003   (DE) ............................... 103 39 126

(51) Int. Cl.
*G01B 7/14* (2006.01)
*G01B 7/30* (2006.01)

(52) U.S. Cl. ............................ 324/207.22; 324/207.25; 324/261

(58) Field of Classification Search ............ 324/207.22, 324/207.25, 261; 73/514.16, 514.31, 514.39; 403/122; 280/511

See application file for complete search history.

(56) References Cited

U.S. PATENT DOCUMENTS

| 4,722,631 A * | 2/1988 | Tagami ....................... 403/133 |
| 6,879,240 B2 | 4/2005 | Kruse |
| 2004/0100357 A1 | 5/2004 | Kruse |

FOREIGN PATENT DOCUMENTS

| DE | 101 10 738 | 11/2002 |
| DE | 101 34 259 | 2/2003 |
| EP | 0 617 260 | 9/1994 |

* cited by examiner

Primary Examiner—Bot LeDynh
(74) Attorney, Agent, or Firm—McGlew & Tuttle, P.C.

(57) ABSTRACT

A ball and socket joint with integrated angle sensor, especially for use as a vehicle level control in the chassis of a motor vehicle. The ball and socket joint has a ball and socket joint housing (1), a ball pivot (2) mounted in the ball and socket joint housing (1), a bipolar field transducer (4) arranged at the joint ball (3) of the ball pivot (2), and at least one magnetic field direction sensor (5), which is arranged at the ball and socket joint housing (1) and interacts with the magnetic field generated by the field transducer (4), wherein only one pole of the bipolar field transducer (4) is arranged on the surface of the ball.

20 Claims, 3 Drawing Sheets

BALL-AND-SOCKET JOINT WITH AN ANGLE SENSOR

CROSS REFERENCE TO RELATED APPLICATIONS

This application is a United States National Phase application of International Application PCT/DE2004/001855 and claims the benefit of priority under 35 U.S.C. § 119 of German Application DE 103 39 126.6 filed Aug. 22, 2003, the entire contents of which are incorporated herein by reference.

FIELD OF THE INVENTION

The present invention pertains to a ball and socket joint with an integrated angle sensor, especially for use as a vehicle level sensor in the chassis of a motor vehicle.

BACKGROUND OF THE INVENTION

The use of a ball and socket joint as a vehicle level sensor for the contactless and continuous measurement of the changes in the position of the vehicle body in motor vehicle chassis, wherein the ball and socket joint housing and the ball pivot are arranged between the vehicle chassis and the wheel suspension, is known from EP 617 260 A1. It is proposed in that document that the information obtained from the vehicle level sensor be used for headlight leveling control and/or vehicle level control.

The ball and socket joint has a bipolar field transducer arranged at the joint ball of the ball pivot and a magnetoresistive sensor arranged at the ball and socket joint housing in the range affected by the field transducer. The sensor shall detect here the position of the ball pivot or a change in this position, during which the position of the field transducer in relation to the sensor and consequently the magnetic field at the site of the sensor changes, as accurately as possible via the detected field. It is proposed for this purpose that the sensor and the field transducer be arranged opposite each other in the joint ball and in the ball and socket joint housing, so that the measured signals generated reflect the actual changes in the position of the vehicle body, without interference by three-dimensional motions occurring in the axle area of a vehicle.

However, measurement results that are sufficient for the motor vehicle cannot be expected with the one sensor in terms of accuracy in the case of this ball pivot, because the sensor can measure only one direction of motion (degree of freedom) of the ball pivot, and the other two degrees of freedom must be determined by means of electronic evaluation or excluded.

To improve the accuracy of measurement, it is proposed, furthermore, in the patent application DE 101 34 259 A1 that at least two field sensors be arranged in the ball and socket joint housing diametrically opposite each other on an orbit in the area of the ball surface. It is thus possible with the two different poles of the field transducer, which are arranged on the ball surface, to determine a pivoting and rotation about its central axis. To determine the exact position of the ball pivot in space in relation to the ball and socket joint housing in all three degrees of freedom, it is proposed that three field sensors be arranged on the orbit at a distance of 120°.

SUMMARY OF THE INVENTION

The object of the present invention is to create a ball and socket joint in which the deflection of the ball pivot in the ball and socket joint housing can be detected with high accuracy with the use of only a few sensors.

According to the invention, a ball and socket joint is provided having a ball pivot mounted in the ball and socket joint housing, a bipolar field transducer arranged at the joint ball of the ball pivot, and at least one magnetic field direction sensor, which is arranged at the ball and socket joint housing and which interacts with the field generated by the field transducer. Only one pole of the field transducer is arranged on (or directed toward) the surface of the ball. Due to one pole of the field transducer being arranged on (or directed toward) the surface of the ball, a radial magnetic field is obtained in the range of detection of the magnetic field direction sensor, contrary to the arrangement in which both poles are arranged on (or directed toward) the surface of the ball. This permits accurate determination of the deflection of the ball pivot in a pivot axis with only one sensor. The shape of the ball head surface is only compromised very slightly by the inserted field transducer.

If a field transducer, e.g., a bar magnet, is arranged in the axis of symmetry of the ball pivot, rotary motions of the ball pivot about its axis of symmetry in any deflection position cannot affect the measurement of the deflection of the ball pivot, because the direction of the magnetic field at the site of the sensor remains nearly identical during each rotation because of the radial magnetic field. This is especially advantageous during the determination of the level position of vehicles via the motion of the wheel suspension, because rotary motion of the ball head about its axis of symmetry, which distorts the measurement and is caused by a steering motion, is faded out here.

The field transducer may be embedded in the ball head in a layer consisting of a nonmagnetic material, so that the joint ball can be made of metal for transmitting strong joint forces. Magnetic coupling of the inner pole of the field transducer with the metallic joint ball improves the shape of the magnetic field in the range of detection of the magnetic field direction sensor.

The use of at least two magnetic field direction sensors, which interact with the field generated by the magnetic field transducer and whose reference axes do not extend in parallel to one another, makes it possible to detect the deflection of the ball pivot in any direction.

For simple mounting, the magnetic field direction sensors are arranged on a plate, for example, on a closing cover of the ball and socket joint housing. To effectively detect the deflection of the ball pivot, the sensors are arranged at an angle of 90° in relation to one another on the plate and the plate itself is arranged at right angles to the central axis of the ball pivot. It is possible due to this arrangement to determine the tilting of the ball pivot along the two degrees of freedom with only one material measure, the field transducer.

The present invention will be explained in greater detail below with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
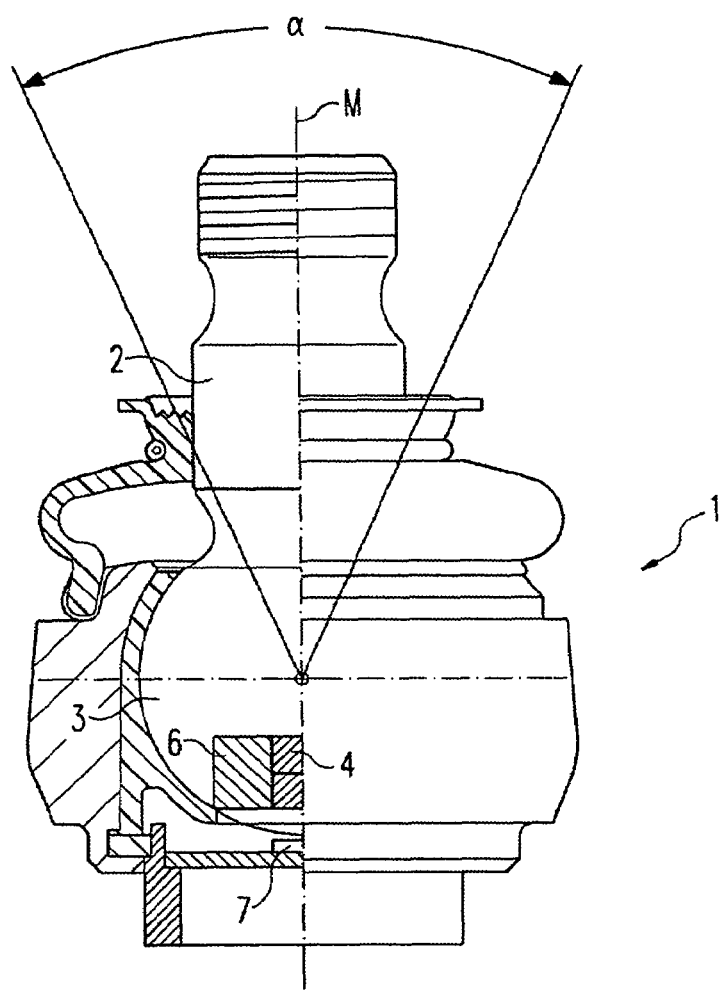
FIG. 1 is a partial sectional view of an exemplary embodiment of the ball and socket joint according to the present invention.

Referring to the drawings in particular, the ball and socket joint shown in a partial section in FIG. 1 comprises a ball and socket joint housing 1 and a ball pivot 2 mounted with its joint ball 3 in the ball and socket joint housing 1. The ball and socket joint shall be used in the chassis of a vehicle as a vehicle level transducer, whose signals can be used, for example for the static or dynamic headlight and/or vehicle level control, wherein either the ball and socket joint housing 1 or the ball pivot 2 is connected with the wheel suspension and the ball pivot 2 or the ball and socket joint housing 1 is connected with the chassis of the vehicle.

The ball and socket joint is arranged here between the wheel suspension and the chassis such that when the position of the vehicle body changes in relation to the wheel suspension, the ball pivot 2 is deflected in the ball and socket joint housing 1, and this deflection truly reflects the change in the position of the vehicle body in relation to the road.

To detect the deflection of the ball pivot 2 in the ball and socket joint housing 1, a bar magnet is recessed as a field transducer in the joint ball 3 of the ball pivot 2, which said bar magnet generates a magnetic field, which is detected by one or more magnetic field direction sensors 5, arranged at the ball and socket joint housing 1, e.g., magnetoresistive angle sensors. The maximum deflection of the ball pivot 2 in the ball and socket joint housing 1 is indicated by the angle α in FIG. 1.

Since the highest surface pressures occur, in general, in the equatorial area of the joint ball, the field transducer 4 is recessed in the lower part of the joint ball. In the example being shown in FIG. 1, the field transducer is embedded in the joint ball 3 in a ring 6 made of a nonmagnetic material, which makes it possible to make the joint ball 3 from a ferromagnetic material.

The field transducer may be manufactured from generally known permanent magnetic materials, e.g., Alnico 500 or barium ferrite. It is preferably manufactured as a permanent magnet made from materials with a high Q factor $(B H)_{max}$, e.g., $SmCo_5$, $SM_2Co_{17}$, $Nd_2Fe_{14}B$ or similar materials.

The sensors are located on a plate 7, e.g., a printed circuit board, in the ball and socket joint housing 1.

Figure 2:
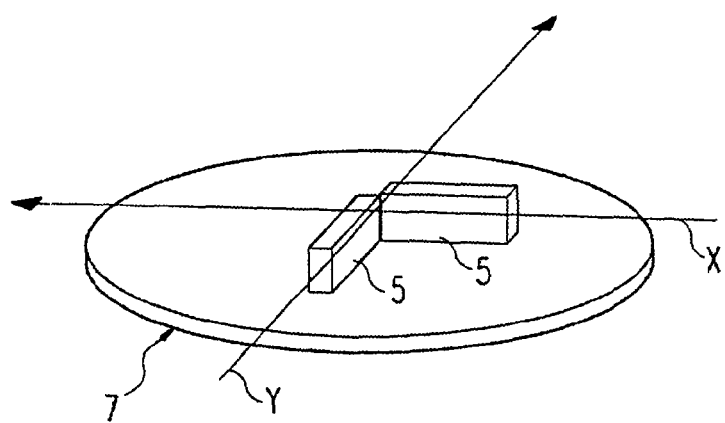
FIG. 2 is a plate integrated in the ball and socket joint housing of the ball and socket joint shown in FIG. 1 with two magnetic field direction sensors.

FIG. 2 shows the arrangement of the magnetic field direction sensors 5 on the plate 7. The magnetic field direction sensors 5 with their measuring reference axes x, y are positioned here at an angle of 90° in relation to one another and in one plane on the plate 7. Experiments have shown that good results are obtained in the detection of the deflection of the ball pivot 2 if the magnetic field direction sensors 5 are arranged on the plate 7 close to one another and the plate 7 itself is arranged at right angles to the central axis M of the ball pivot 2.

Figure 3:
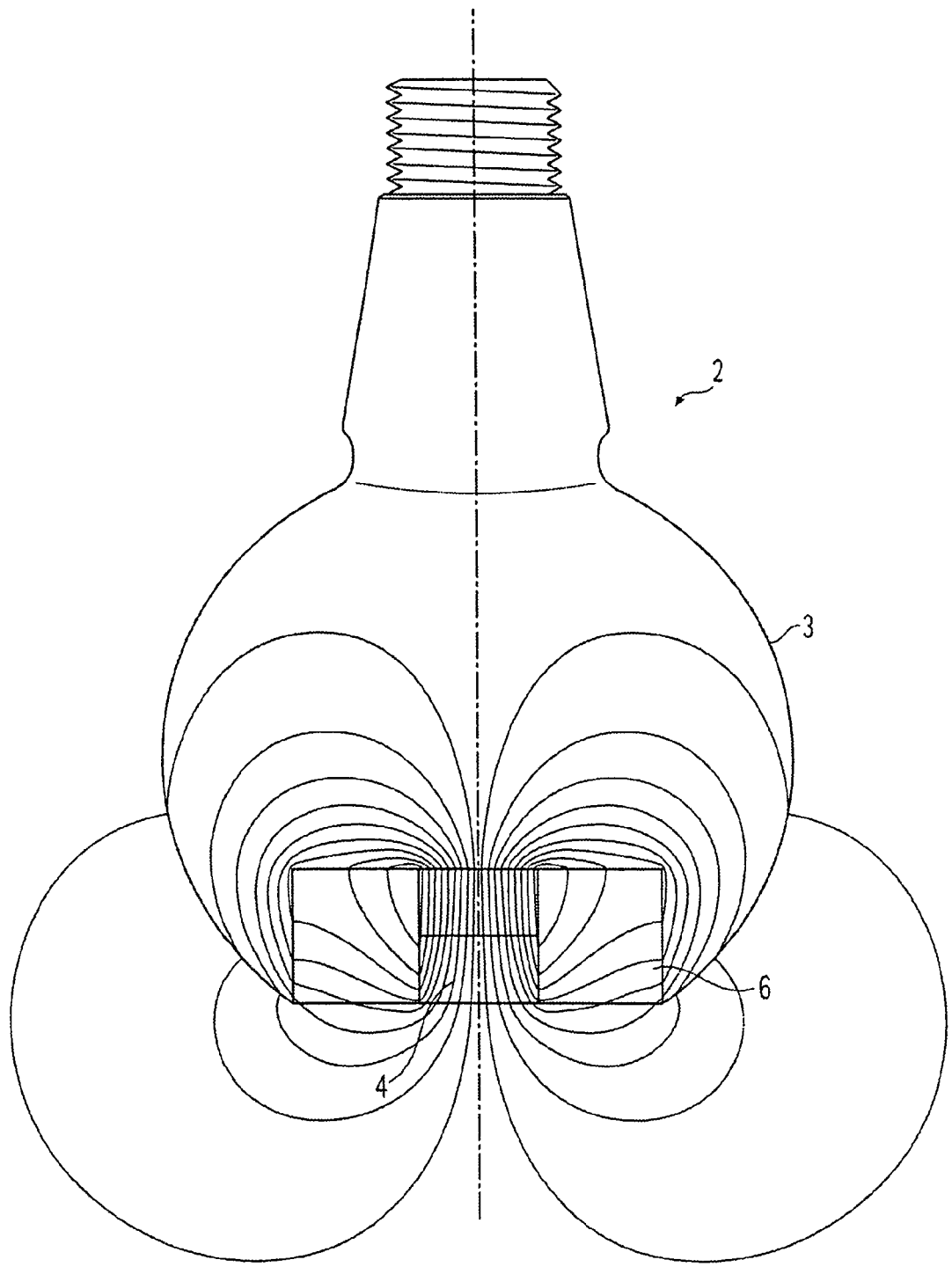
FIG. 3 is a partial sectional view of a ball pivot with a corresponding shape of the lines of flux according to an exemplary embodiment of the present invention.

FIG. 3 shows the ball pivot 2 in a section with the corresponding shape of the lines of flux according to one exemplary embodiment of the present invention. Due to the field transducer 4 being arranged in parallel to the axis of symmetry of the ball pivot 2 and the arrangement of the magnetic field direction sensors 5 at right angles to the field transducer 4, a radial shape of the lines of flux is obtained in the range of detection of the sensors.

The position of the field transducer 4 and consequently the shape of the fields of flux at the site of the magnetic field direction sensors 5 change during the deflection of the ball pivot 2 in the ball and socket joint housing. The magnetic field direction sensors 5 detect the corresponding angles of the shape of the magnetic field at their sites for each position or deflection of the ball pivot 2. This makes it possible to determine the deflection of the ball pivot 2 in the ball and socket joint housing 1 along the two degrees of freedom with only one material measure, the field transducer 4.

In the example shown in FIG. 3, the insulation 6 of the field transducer 4 extends to the lateral area of the field transducer. The pole of the field transducer 4 located in the joint ball is, in contrast, in contact with the ferromagnetic joint ball 3. As is shown in FIG. 3, this leads to a stretching of the shape of the lines of flux, which improves the detection of deflections of the ball pivot 2 by the magnetic field direction sensors 5.

Due to the field transducer 4 being arranged in the axis of symmetry of the ball pivot 2, effects of rotary motions of the ball pivot 2 about its axis of symmetry during the measurement can be eliminated, because, contrary to a deflection of the ball pivot 2, the direction of the magnetic field at the site of the sensors or the angle detected by the sensors is nearly the same during a rotation of the ball pivot 2 because of the radial magnetic field. Such rotary motions of the ball pivot 2, which are undesired for the measurement, may occur, e.g., during steering motions when the ball and socket joint is used in a wheel suspension as a vehicle level transducer.

When the ball and socket joint is used as a vehicle level transducer in a wheel suspension, a measuring reference axis x of a magnetic field direction sensor 5 is advantageously directed along the change in the level position of the body during tilting, so that the other measuring reference axis y or the other magnetic field direction sensor 5 detects the pull-up motion of the vehicle which occurs due to the decelerating or accelerating load.

Figure 4:
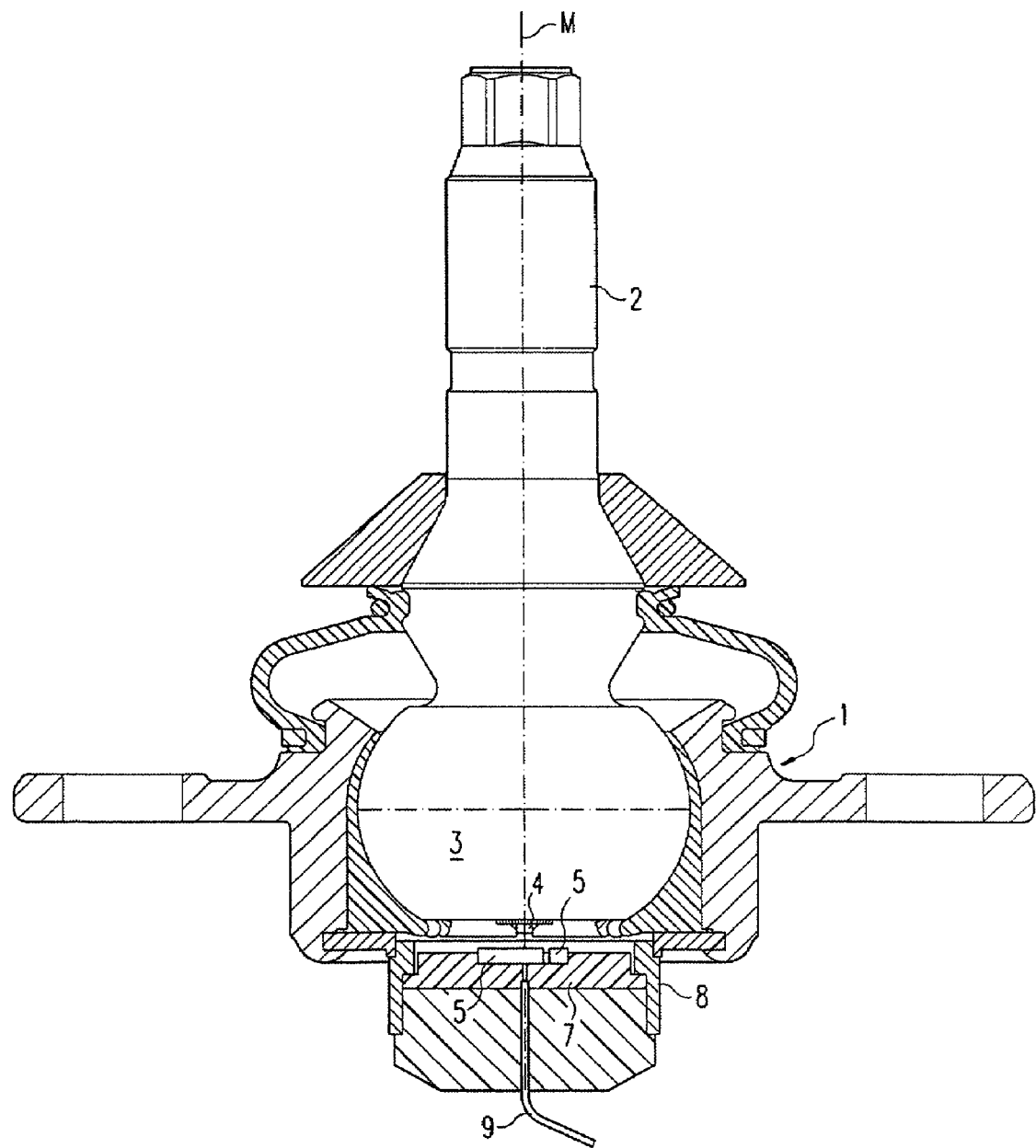
FIG. 4 is a sectional view of another exemplary embodiment of the ball and socket joint according to the present invention.

FIG. 4 shows in a sectional view another exemplary embodiment of the ball and socket joint according to the present invention. The sensors are arranged according to this embodiment on a closing cover 8 of the ball and socket joint housing 1 for easy mounting or positioning in relation to the field transducer 4 on the plate 7. The ball and socket joint housing 1 has, in the lower area, an opening, which is closed with the closing cover 8, e.g., by means of ultrasonic welding or hot caulking. The magnetic field direction sensors 5 are located according to this embodiment on a plate 7, which forms a printed circuit board and is part of the closing cover 8. After closing the ball and socket joint housing 1 with the closing cover 8, the sensors are positioned in relation to the field transducer 4 recessed in the joint ball 3.

The ball and socket joint housing 1 as well as the closing cover 8 can be manufactured in the known manner according to the injection molding technique, the cable 9 contacting the sensors being enclosed by the closing cover 8 and being led to the outside, so that strain relief and sealing of the cable 9 via the closing cover 8 are achieved at the same time. The cable 9 led out of the ball housing may be contacted via a plug type connector.

It is also possible to mount the sensor module in the ball and socket joint housing 1 and to establish a connection between the cable 9 and the mounted sensor module by means of a plug connection when the closing cover 8 is attached.

While specific embodiments of the invention have been shown and described in detail to illustrate the application of the principles of the invention, it will be understood that the invention may be embodied otherwise without departing from such principles.

The invention claimed is:

1. A ball and socket joint comprising:
   a ball and socket joint housing;
   a ball pivot mounted in the ball and socket joint housing, said ball pivot having a joint ball with a surface;
   a bipolar field transducer arranged at the joint ball of the ball pivot; and
   a magnetic field direction sensor, which is arranged at the ball and socket joint housing and interacts with the magnetic field generated by the field transducer, wherein only one pole of the bipolar field transducer is arranged on the surface of the ball.

2. A ball and socket joint in accordance with claim 1, wherein the two poles of the field transducer are arranged in the axis of symmetry of the ball pivot.

3. A ball and socket joint in accordance with claim 1, wherein the field transducer is a bar magnet.

4. A ball and socket joint in accordance with claim 1, wherein the joint ball consists essentially of a ferromagnetic material and the field transducer is embedded in the joint ball in a layer consisting of a nonmagnetic material.

5. A ball and socket joint in accordance with claim 4, wherein the pole of the field transducer located in the joint ball is in contact with the ferromagnetic joint ball.

6. A ball and socket joint in accordance with claim 1, further comprising another magnetic field direction sensor, said magnetic field direction sensor and said another magnetic field direction sensor interacting with the field generated by the field transducer, said magnetic field direction sensor and said another magnetic field direction sensor being arranged at the ball and socket joint housing, wherein the measuring reference axes of the magnetic field direction sensors (5) are located in one plane and do not extend in parallel to one another.

7. A ball and socket joint in accordance with claim 6, wherein the two magnetic field direction sensors are arranged on a plate at an angle of 90° in relation to one another.

8. A ball and socket joint in accordance with claim 7, wherein the plate is arranged at a closing cover of the ball and socket joint housing.

9. A ball and socket joint in accordance with claim 7, wherein the plate is arranged at right angles to the central axis of the ball pivot.

10. A ball and socket joint in accordance with claim 1, wherein the ball and socket joint is used as a vehicle level control in a chassis of a vehicle, wherein the ball and socket joint housing and the ball pivot are arranged between the chassis of the vehicle and the wheel suspension of the vehicle.

11. A ball and socket joint comprising:
    a ball and socket joint housing;
    a ball pivot mounted in the ball and socket joint housing, said ball pivot having a joint pin and a joint ball with a surface opposite said joint pin;
    a bipolar field transducer arranged within the joint ball of the ball pivot with one pole of the bipolar field transducer arranged on said surface of the ball, said bipolar field transducer generating a magnetic field; and
    a magnetic field direction sensor arranged at the ball and socket joint housing for sensing a position and direction of said magnetic field generated by said field transducer.

12. A ball and socket joint in accordance with claim 11, wherein each of two poles of the bipolar field transducer are arranged adjacent to or passing through an axis of symmetry of the ball pivot.

13. A ball and socket joint in accordance with claim 11, wherein the field transducer is a bar magnet.

14. A ball and socket joint in accordance with claim 11, further comprising a non magnetic layer formed in an end of said joint ball, wherein a main portion of the joint ball consists essentially of a ferromagnetic material and the field transducer is embedded in the joint ball in said non magnetic layer.

15. A ball and socket joint in accordance with claim 14, wherein the other pole of the field transducer is located in the joint ball and is in contact with the main portion of the joint ball.

16. A ball and socket joint in accordance with claim 11, further comprising another magnetic field direction sensor, said magnetic field direction sensor and said another magnetic field direction sensor interacting with the field generated by the field transducer, said magnetic field direction sensor and said another magnetic field direction sensor being arranged at the ball and socket joint housing, wherein the measuring reference axes of the magnetic field direction sensors are located in one plane and do not extend in parallel to one another.

17. A ball and socket joint in accordance with claim 16, wherein each of said magnetic field direction sensor and said another magnetic field direction sensor are arranged on a plate at an angle of 90° in relation to one another.

18. A ball and socket joint in accordance with claim 17, wherein the plate is arranged at a closing cover of the ball and socket joint housing.

19. A ball and socket joint in accordance with claim 17, wherein the plate is arranged at right angles to a central axis of the ball pivot.

20. A ball and socket joint in accordance with claim 10, wherein the ball and socket joint is used as a vehicle level control in a chassis of a vehicle, wherein the ball and socket joint housing and the ball pivot are arranged between the chassis of the vehicle and a wheel suspension of the vehicle.

* * * * *